(12) United States Patent
Ohtani et al.

(10) Patent No.: US 11,514,387 B2
(45) Date of Patent: Nov. 29, 2022

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Fumiki Ohtani, Toyota (JP); Hirofumi Kamimaru, Fukuoka (JP); Riho Matsuo, Nagoya (JP); Shodai Kato, Toyota (JP); Atsushi Yoshida, Tokyo-to (JP); Shunsuke Tanimori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 327 days.

(21) Appl. No.: 16/537,705

(22) Filed: Aug. 12, 2019

(65) Prior Publication Data
US 2020/0065742 A1  Feb. 27, 2020

(30) Foreign Application Priority Data

Aug. 21, 2018  (JP) .............................. JP2018-154728

(51) Int. Cl.
*G06Q 10/08* (2012.01)
*G06Q 50/30* (2012.01)

(52) U.S. Cl.
CPC ......... *G06Q 10/083* (2013.01); *G06Q 10/087* (2013.01); *G06Q 50/30* (2013.01)

(58) Field of Classification Search
CPC .... G06Q 10/083; G06Q 10/087; G06Q 50/30; G06Q 30/02; G06Q 30/0283

USPC ...................... 705/7.33, 7.35, 330, 335, 400
See application file for complete search history.

(56) References Cited

U.S. PATENT DOCUMENTS

| 2002/0010611 | A1 | 1/2002 | Yamaji et al. |
| 2014/0330741 | A1* | 11/2014 | Bialynicka-Birula ...................... G06Q 10/0838 705/341 |
| 2015/0006005 | A1* | 1/2015 | Yu ........................... G06Q 50/28 701/22 |
| 2017/0169385 | A1* | 6/2017 | High ..................... G06Q 10/083 |
| 2018/0342007 | A1* | 11/2018 | Brannigan .......... G06Q 30/0635 |
| 2018/0363843 | A1* | 12/2018 | Huang ................... F16M 13/02 |

(Continued)

FOREIGN PATENT DOCUMENTS

| JP | 2002-056245 A | 2/2002 |
| JP | 2002-216041 A | 8/2002 |
| JP | 2018-073032 A | 5/2018 |

OTHER PUBLICATIONS

"Choice-Based Demand Management and Vehicle Routing in E-fulfilment," By Xinan Yang, Arne K. Strauss, Christine Currie, and Richard Eglese, Jul. 1, 2013 (Year: 2013).*

*Primary Examiner* — Jeff Zimmerman
*Assistant Examiner* — Brian Adams Heflin
(74) *Attorney, Agent, or Firm* — Oliff PLC

(57) ABSTRACT

An object is to deliver more packages together. A number of first packages scheduled to be delivered by a vehicle that delivers packages to a predetermined area is acquired, the cost of delivering second packages by the vehicle is set on the basis of the number of first packages, the second packages being different from the first packages, and information on the cost is provided to a user present within the predetermined area.

6 Claims, 12 Drawing Sheets

(56) References Cited

U.S. PATENT DOCUMENTS

2019/0132702 A1\* 5/2019 Ehsani ................ H04W 4/025
2019/0164125 A1\* 5/2019 Boss ............... G06Q 10/08345

\* cited by examiner

| USER ID | DELIVERY LOCATION | VEHICLE ID | PACKAGE ID |
|---|---|---|---|
| 11 | A1 | A21 | B1 |
| 12 | A2 | A22 | B2 |
| 13 | A3 | A23 | B3 |
| ... | ... | ... | ... |

Fig. 4

| USER ID | DEPARTURE POINT | DELIVERY AREA | DELIVERY PERIOD |
|---|---|---|---|
| 21 | D1 | E1 | F1 |
| 22 | D2 | E2 | F2 |
| 23 | D3 | E3 | F3 |
| ... | ... | ... | ... |

Fig. 5

| USER ID | CURRENT LOCATION |
|---|---|
| 31 | G1 |
| 32 | G2 |
| 33 | G3 |
| ... | ... |

Fig. 6

| VEHICLE ID | DEPARTURE POINT | DELIVERY FEE |
|---|---|---|
| A21 | D1 | ○○○ |
| A22 | D2 | ××× |
| A23 | D3 | △△△ |
| ... | ... | ... |

| VEHICLE ID | TIME RANGE | NUMBER OF PACKAGES | DEPARTURE POINT | DELIVERY AREA |
|---|---|---|---|---|
| A21 | 9-10 | 2 | D1 | E1 |
| A22 | 10-11 | 3 | D2 | E2 |
| A23 | 11-12 | 1 | D3 | E3 |
| ... | ... | ... | ... | ... |

Fig. 14

| TIME RANGE | DEPARTURE POINT | ESTIMATED FEE |
|---|---|---|
| 9-10 | D1 | ○○○ |
| 10-11 | D2 | × × × |
| 11-12 | D3 | △△△ |
| ... | ... | ... |

# INFORMATION PROCESSING APPARATUS, INFORMATION PROCESSING METHOD, AND NON-TRANSITORY STORAGE MEDIUM

CROSS REFERENCE TO RELATED APPLICATION

This application claims the benefit of Japanese Patent Application No. 2018-154728, filed on Aug. 21, 2018, which is hereby incorporated by reference herein in its entirety.

BACKGROUND

Technical Field

The present disclosure relates to an information processing apparatus, an information processing method, and a non-transitory storage medium.

Description of the Related Art

In the field of systems for delivering products ordered by users, a technique for calculating the delivery fee according to orders when the same user makes multiple orders is known (see Patent document 1, for example). (see Patent document 1, for example).

CITATION LIST

Patent Document

[Patent document 1] Japanese Patent Laid-Open No. 2002-216041

SUMMARY

An object of the present disclosure is to deliver more packages together.

An aspect of the present disclosure is an information processing apparatus including a controller, wherein the controller acquires a number of first packages scheduled to be delivered by a vehicle that delivers packages to a predetermined area, the controller sets the cost of delivering second packages by the vehicle on the basis of the number of first packages, the second packages being different from the first packages, and the controller provides information on the cost to a user present within the predetermined area.

An aspect of the present disclosure is an information processing method including: acquiring a number of first packages scheduled to be delivered by a vehicle that delivers packages to a predetermined area; setting the cost of delivering second packages by the vehicle on the basis of the number of first packages, the second packages being different from the first packages; and providing information on the cost to a user present within the predetermined area.

An aspect of the present disclosure is a non-transitory storage medium stored with an information processing program, the information processing program for causing a computer to: acquire a number of first packages scheduled to be delivered by a vehicle that delivers packages to a predetermined area; set the cost of delivering second packages by the vehicle on the basis of the number of first packages, the second packages being different from the first packages; and provide information on the cost to a user present within the predetermined area.

According to the present disclosure, more packages can be delivered together.

BRIEF DESCRIPTION OF THE DRAWINGS

FIG. 4 is a diagram illustrating an example of the table configuration of information stored in a requesting user information DB;

FIG. 5 is a diagram illustrating an example of the table configuration of vehicle information stored in a vehicle information DB;

FIG. 6 is a diagram illustrating an example of the table configuration of positional information stored in a positional information DB;

FIG. 9 is a diagram illustrating an example of a screen displayed on the output unit of a potential user terminal when the potential user terminal receives fee information from the server;

FIG. 14 is a diagram illustrating an example of the table configuration of history information stored in a history information DB according to the second embodiment;

FIG. 15 is a diagram illustrating an example of a screen displayed on the output unit of a potential user terminal receiving estimated fee information according to the second embodiment.

DESCRIPTION OF THE EMBODIMENTS

Figure 1:
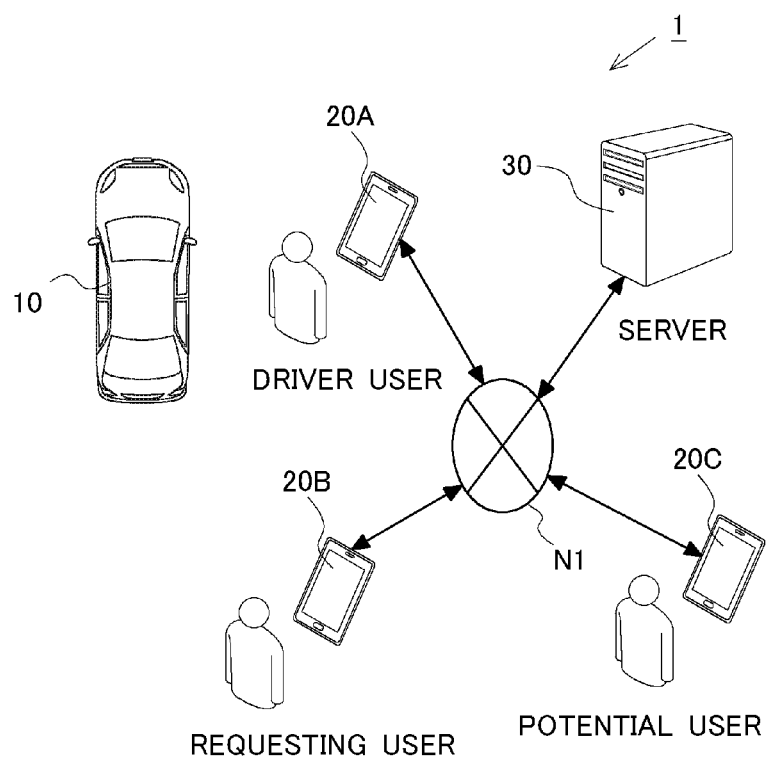
FIG. 1 is a diagram illustrating a schematic configuration of a delivery system according to an embodiment.

An information processing apparatus, which is one aspect of the present disclosure, acquires the number of packages (first packages) delivered by a vehicle. These packages are packages confirmed to be delivered by the vehicle. These packages are packages to be delivered by the vehicle to users present within a predetermined area. The predetermined area is, for example, an area to which the vehicle is predetermined to deliver packages, or an area to which the vehicle can deliver packages. This predetermined area is also, for example, an area in which the load on the driver of the vehicle or the vehicle falls within an allowable range even if the path of the travel of the vehicle is changed. Examples of the load on the driver or vehicle include time load and cost load. Note that the number of packages can be considered to be equal to the number of users who request the delivery of packages. If other packages (second packages) are confirmed to be delivered thereafter, a controller sets the cost of delivering the second packages, according to the number of first packages. An upper limit or lower limit can be set for this cost.

The controller provides information on the cost set in this manner to users. The users are users who are present within a predetermined area and yet to demand the delivery of packages. Once information on the cost is provided, for example, the cost is displayed on terminals owned by the users. Users demand to purchase products and demand the delivery of these products in packages in some cases depending on the information on the provided cost. This can encourage users to purchase products. In addition, cost reduction is achieved because more packages can be transported once. When a user demands the delivery of second packages by a vehicle, the number of first packages increases, which further lowers the cost. This further increases user's motivation to purchase products and thus further promotes the purchase of products, so that more packages can be transported. For example, in the case where a store exists at a place to which packages are sent, the number of products purchased by users can increase, thereby increasing sales.

In addition, when a user demands the delivery of the second packages, the controller may generate a path of the vehicle passing through the location of the user and provide the generated path to the driver of the vehicle or the vehicle.

The location of a user is, for example, the location where the user exists, or the location that the user demands as the destination of a delivered package. When a user requests the delivery of a second package by a vehicle, the second package changes to a first package. In addition, the travel path of the vehicle can be generated so that the first package can be delivered to that user. If the vehicle travels along this travel path, the package can be delivered to the user. Note that the travel path may be provided to the vehicle or the driver of the vehicle. In the case where the travel path is provided to the vehicle, the vehicle may automatically travel to a destination, or the travel path may be displayed on the display or the like of the vehicle in such a manner that the vehicle indicates the travel path to the driver. In the case where the travel path is provided to the driver of the vehicle, for example, information indicating a travel path may be transmitted to a terminal owned by the driver of the vehicle.

In addition, the controller may set the cost so that the larger the number of first packages, the lower the cost.

A decrease in the cost of delivery increases the probability that users demand delivery, so that more products can be purchased. Note that the cost may be decreased each time the number of first packages increases by one, or each time the number of first packages increases by two or three or more. The number of first packages at which the cost changes may be arbitrarily determined.

In addition, the controller may calculate an estimated cost, which is the future cost of delivery of the second packages by the vehicle, on the basis of the number of the first packages acquired in the past, and provide information on the calculated estimated cost to the users.

The future number of first packages can be estimated on the basis of the past number of first packages. For example, there is correlation between the date, day, time, weather, or the like and the number of first packages in some cases. The future number of first packages can be estimated on the basis of this correlation. Aside from that, for example, in the event of sale, event, or the like at a commercial facility, an increase in the number of first packages is estimated. In this case, a decrease in the cost of delivery is estimated on the basis of the number of first packages in the past, so that providing that information to users can increase the number of first packages. This can further lower the cost of delivery, thereby further promoting the purchase of products. More packages can be delivered together.

An embodiment of the present disclosure will now be described with reference to the accompanying drawings. The configurations in the embodiments below are merely illustrative, and the present disclosure is not limited to the configurations in the embodiments. Further, the embodiments below can be used in any possible combination.

First Embodiment

FIG. 1 is a diagram illustrating a schematic configuration of a delivery system 1 according to an embodiment. In the example illustrated in FIG. 1, the delivery system 1 includes a vehicle 10 driven by a driver user, a driver user terminal 20A used by the driver user, a requesting user terminal 20B used by a requesting user, a potential user terminal 20C used by a potential user, and a server 30. Note that the driver user is a user who carries packages to a place demanded by a requesting user by driving the vehicle 10, thereby delivering the packages. Note that the packages are carried from a predetermined place. The driver user may be a delivery company or a registered general user. The place demanded by the requesting user is within the predetermined area. The requesting user is a user who requested the delivery of packages by the vehicle 10 and to whom the packages are scheduled to be delivered by the vehicle 10. The potential user is a user who did not request the delivery of packages by the vehicle 10 and to whom the packages are not scheduled to be delivered by the vehicle 10. There are multiple driver users, requesting users, and potential users. In addition, the number of driver user terminals 20A and vehicles 10 is equal to the number of driver users using the delivery system 1, the number of requesting user terminals 20B is equal to the number of requesting users using the delivery system 1, and the number of potential user terminals 20C is equal to the number of potential users using the delivery system 1. Note that vehicles 10 may be vehicles that perform automatic driving (hereinafter referred to as automatic driving vehicles). In this case, no driver users exist, driver user terminals 20A are terminals mounted in vehicles 10, and driver user terminals 20A move vehicles 10 along a travel path for package delivery.

When not distinguished from each other, the driver user terminal 20A, the requesting user terminal 20B, and the potential user terminal 20C are simply referred to as "user terminal 20" below. When not distinguished from each other, the driver user, requesting user, and potential user are simply referred to as "user". The user terminals 20 and the server 30 are connected to each other via a network N1. The network N1 is a worldwide public communication network, such as the Internet, and may be, for example, a wide area network (WAN) or other communication networks. In addition, the network N1 may include a telephone communication network such as that for cellular phones, or a wireless communication network such as Wi-Fi.

The delivery system 1 is, for example, a system for delivering products purchased by users through mail order. In this case, a requesting user is a user who purchased a product and requested delivery, and a potential user is a user who did not purchase a product. The delivery system 1 provides potential users with information on the fee of package delivery by a vehicle 10 departing from a predetermined place and heading to a predetermined place. A potential user purchasing a product and demanding package delivery by a vehicle 10 changes to a requesting user. The server 30 generates a travel path of the vehicle 10 so that all the packages can be transported to a place demanded by the requesting user. The generated travel path is transmitted to the driver user terminal 20A and the requesting user terminals 20B. Note that the driver user terminal 20A may just display the received travel path on a map or guide to the travel direction of the vehicle 10 along the received travel path.

When any potential user terminal 20C exists within a predetermined area, the server 30 transmits information on the fee of package delivery by the vehicle 10 to this potential user terminal 20C. This fee is one example of the cost of package delivery by the vehicle 10. The predetermined area is, for example, an area in the same city, town, or village. Note that when there is a requesting user, the server 30 changes the travel path of the vehicle 10 so that a package can be delivered to this requesting user. A predetermined place may also be, for example, a place where a package is loaded to a vehicle 10, which may be a store or its warehouse, or the storage of packages. The predetermined place may be in or out of the predetermined area. A location to which the requesting passenger user demands delivery can be pre-registered to the server 30. The package delivery fee is set by the server 30, for example, so that it decreases with an increase in the number of packages. Hence, when a potential user changes to a requesting user by demanding package delivery, the package delivery fee decreases according to the number of requesting users.

Note that the package delivery fee that each requesting user is supposed to pay is determined at the time when the requesting user requests package delivery. Accordingly, after the delivery fee for a package related to one requesting user is confirmed, the delivery fee for this requesting user does not decrease even if the delivery fee decreases with an increase in the number of other requesting users. Note that it is also possible to lower the delivery fee for that requesting user like the fee for the other requesting user. The server 30 generates, during the travel period of the vehicle 10, a travel path so that the vehicle 10 passes through the location demanded by the requesting user, and transmits the travel path to the driver user terminal 20A. Note that a place to which the vehicle 10 delivers a package may be predetermined, and the requesting user may go to the place to pick up the package. In this case, the aforementioned predetermined area may be an area from which the requesting user can travel on foot.

Figure 2:
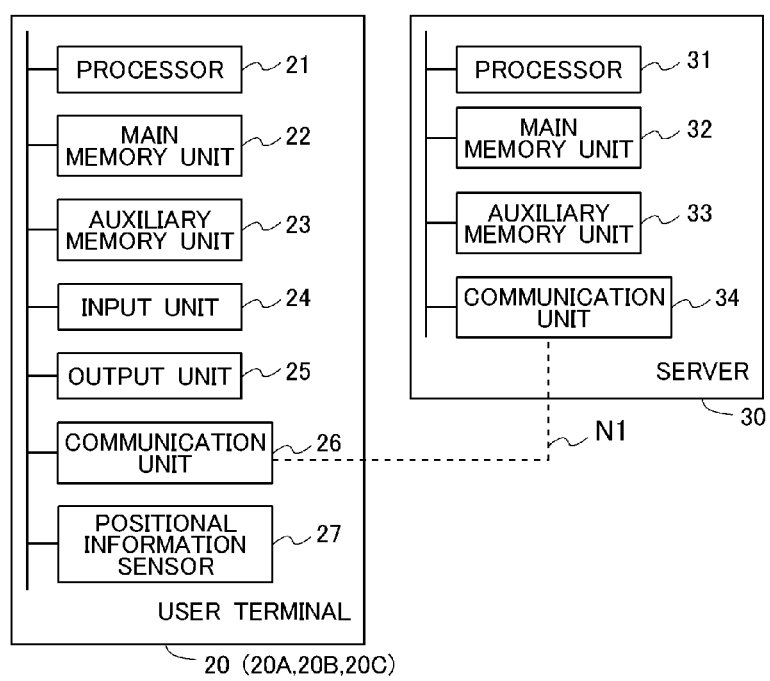
FIG. 2 is a block diagram schematically illustrating one example of the configurations of a user terminal and a server constituting a delivery system according to a first embodiment.

The hardware configurations of the user terminals 20 and the server 30 will now be described with reference to FIG. 2. FIG. 2 is a block diagram schematically illustrating one example of the configurations of the user terminals 20 and the server 30 constituting the delivery system 1 according to this embodiment.

The server 30 has a typical computer configuration. The server 30 includes a processor 31, a main memory unit 32, an auxiliary memory unit 33, and a communication unit 34. They are connected to each other via a bus.

The processor 31 is a central processing unit (CPU), a digital signal processor (DSP), or the like. The processor 31 controls the server 30 and performs various logic operations for information processing. The processor 31 is one example of "controller". The main memory unit 32 is a random access memory (RAM), a read only memory (ROM), or the like. The auxiliary memory unit 33 is an erasable programmable ROM (EPROM), a hard disk drive (HDD), a removal medium, or the like. The auxiliary memory unit 33 stores an operating system (OS), various programs, various tables, and the like. The processor 31 loads the programs stored in the auxiliary memory unit 33 into the work area of the main memory unit 32 and executes it, and the components are controlled through this execution of the programs. Thus, the server 30 implements a function meeting a predetermined objective. The main memory unit 32 and the auxiliary memory unit 33 are computer-readable recording media. Note that the server 30 may be a single computer or multiple computers in cooperation. Information stored in the auxiliary memory unit 33 may be stored in the main memory unit 32. Information stored in the main memory unit 32 may be stored in the auxiliary memory unit 33.

The communication unit 34 is a means for communication with the user terminals 20 via the network N1. The communication unit 34 is, for example, a wireless communication circuit for a local area network (LAN) interface board or wireless communication. The LAN interface board or the wireless communication circuit is connected to the network N1.

Note that a sequence of processing executed in the server 30 can be executed with a hardware or software. The hardware configuration of the server 30 is not limited to that illustrated in FIG. 2.

The user terminals 20 will now be explained. Each user terminal 20 is, for example, a smartphone, a cellular phone, a tablet terminal, a personal information terminal, a wearable computer (such as a smartwatch), a personal computer (PC), or other compact computers. Note that the driver user terminal 20A may be a terminal mounted in the vehicle 10. Each user terminal 20 includes a processor 21, a main memory unit 22, an auxiliary memory unit 23, an input unit 24, an output unit 25, a communication unit 26, and a positional information sensor 27. They are connected to each other via a bus. Description of the processor 21, the main memory unit 22, and the auxiliary memory unit 23, which are similar to the processor 31, the main memory unit 32, and the auxiliary memory unit 33 in the server 30, will be omitted. Note that each user terminal 20 may be a single computer or multiple computers in cooperation. For example, the driver user terminal 20A may be composed of a computer mounted to the vehicle 10 and a computer carried by the driver user which operate in cooperation.

The input unit 24 is a means for receiving an input operation from a user, for example, a touch screen, a push-button, or the like. The output unit 25 is a means for presenting information to the user, for example, a liquid crystal display (LCD), an electroluminescence (EL) panel, a speaker, a lamp, or the like. The input unit 24 and the output unit 25 may constitute one touch screen display. The communication unit 26 is a communication means for connecting the user terminals 20 to the network N1. The communication unit 26 is, for example, a circuit for communication with other apparatuses (for example, the server 30) via the network N1 by utilizing a mobile communication service (a telecommunication network, such as 3rd Generation (3G) or long term evolution (LTE), or wireless communication, such as Wi-Fi).

The positional information sensor 27 acquires information on user terminals 20 in a predetermined cycle. The positional information sensor 27 is, for example, a global positioning system (GPS) receiving unit or a Wi-Fi communication unit. Note that the hardware configuration of the user terminals 20 is not limited to that illustrated in FIG. 2.

Figure 3:
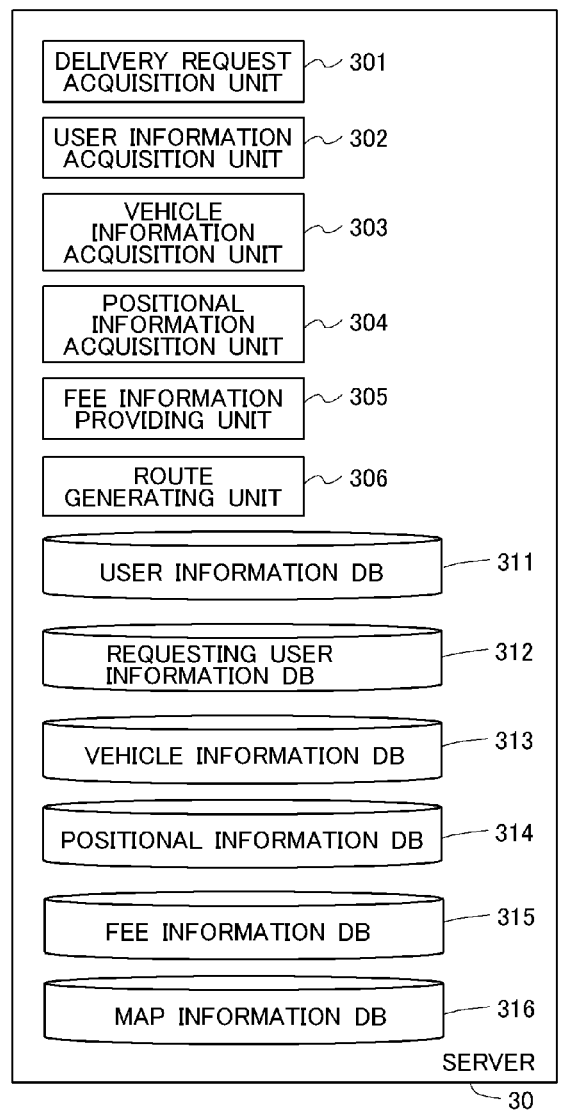
FIG. 3 is a diagram illustrating an example of the functional configuration of the server.

The function of the server 30 will now be explained. FIG. 3 is a diagram illustrating an example of the functional configuration of the server 30. The server 30 includes, as functional elements, a delivery request acquisition unit 301, a user information acquisition unit 302, a vehicle information acquisition unit 303, a positional information acquisition unit 304, a fee information providing unit 305, a route generating unit 306, a user information DB 311, a requesting user information DB 312, a vehicle information DB 313, a positional information DB 314, a fee information DB 315, and a map information DB 316. The processor 31 in the server 30 executes processing in the delivery request acquisition unit 301, the user information acquisition unit 302, the vehicle information acquisition unit 303, the positional information acquisition unit 304, the fee information providing unit 305, and the route generating unit 306, using computer programs in the main memory unit 32. Note that any one of the functional components or part of their processing may be executed with a hardware circuit.

The user information DB 311, the requesting user information DB 312, the vehicle information DB 313, the positional information DB 314, the fee information DB 315, and the map information DB 316 are constructed when programs in a database management system (DBMS) executed by the processor 31 manage data stored in the auxiliary memory unit 33. The user information DB 311, the requesting user information DB 312, the vehicle information DB 313, the positional information DB 314, the fee information DB 315, and the map information DB 316 are, for example, relational databases.

Note that any one of the functional components of the server 30 or part of their processing may be executed with a different computer connected to the network N1.

The delivery request acquisition unit 301 acquires, for example, a delivery request from the potential user terminal 20C of a potential user who demands package delivery by a vehicle 10. A delivery request is information that includes a potential user's identifier and is information that the potential user uses to request package delivery by a vehicle 10. The server 30 treats a user terminal 20 that transmits a delivery request as a potential user terminal 20C until reception of the delivery request, and treats the user terminal 20 that has transmitted the delivery request as a requesting user terminal 20B after reception of the delivery request. For this reason, delivery requests are generated in the potential user terminal 20C. When the server 30 receives a delivery request, a potential user changes to a requesting user. A delivery request includes information on the location to which a requesting user demands package delivery (hereinafter referred to as a delivery location), information on the ID corresponding to the vehicle 10 that the requesting user demands package delivery (hereinafter referred to as a vehicle ID), and information on the ID corresponding to the package for which the requesting user has requested delivery (hereinafter referred to as a package ID). The vehicle ID is the ID corresponding to the vehicle 10 selected by the potential user. The vehicle ID is an identifier unique to the vehicle 10 and is associated with the driver user. The package ID is an identifier unique to the package and is associated with the requesting user. Upon acquisition of a delivery request, the delivery request acquisition unit 301 associates the delivery location, vehicle ID, and package ID with the user ID of the requesting user and stores them in the requesting user information DB 312 which will be described later.

In addition, the user information acquisition unit 302 acquires, for example, information (user information) on the user corresponding to each user terminal 20. The user information includes, for example, the user ID associated with the user, a name, and an address, and in the case of the driver user, includes a vehicle ID. A user ID is an identifier unique to each user. User information is transmitted from the user terminal 20 to the server 30 and is registered to the server 30. Upon acquisition of user information, the user information acquisition unit 302 stores the user information in the user information DB 311 which will be described later.

The vehicle information acquisition unit 303 acquires information on the travel of the vehicle 10 (or the driver user). Note that information on the travel of the vehicle 10 will hereinafter be also referred to as vehicle information. The vehicle information includes information that is transmitted from the driver user terminal 20A to the server 30, and is related to the departure point, delivery area, and delivery period of the vehicle 10 (or the driver user). Note that the departure point may be associated with a store name. The delivery area is, for example, an area to which the vehicle 10 is predetermined to deliver packages (a predetermined area). Upon acquisition of vehicle information, the vehicle information acquisition unit 303 stores the vehicle information in the vehicle information DB 313 which will be described later.

The positional information acquisition unit 304 acquires information on the current locations of potential users (positional information). Positional information on a potential user is transmitted from the potential user terminal 20C to the server 30 at regular intervals. Upon acquisition of positional information from the potential user terminal 20C, the positional information acquisition unit 304 stores the positional information in the positional information DB 314 which will be described later.

The fee information providing unit 305 calculates the delivery fee of that occurs when a potential user currently requests package delivery by a vehicle 10, according to the current number of packages. Calculation of a delivery fee is performed for each vehicle 10. A relationship between the number of packages and the delivery fee is stored in the fee information DB 315. The fee information providing unit 305 then searches for potential users whose current positions are within the area of the delivery by the vehicle 10. Subsequently, the potential user terminal 20C of a potential user found by the searching is provided with information on the delivery fee (fee information). The fee information provided to the potential user also includes information on the departure point of the vehicle 10. Note that the processing in the fee information providing unit 305 will hereinafter be also referred to as "fee information providing processing".

The route generating unit 306 generates a travel path that departs from the departure point of the vehicle 10, passes through all the delivery locations, and returns to the departure point. The travel path is generated based on map information stored in the map information DB 316. The travel path is generated so that it follows a predetermined rule, for example, so that it provides the shortest travel distance of the vehicle 10 or the shortest travel time of the vehicle 10. The route generating unit 306 transmits the generated travel path to the driver user terminal 20A of the driver user. The travel path can be generated using well-known techniques.

The user information DB 311 is made up with user information stored in the auxiliary memory unit 33 and is where association between each user and user information is performed.

The requesting user information DB 312 is made up with information on a delivery location, information on a vehicle ID, and information on a package ID stored in the aforementioned auxiliary memory unit 33, and is where association of each requesting user with information on information on a delivery location, information on a vehicle ID, and information on a package ID is performed. The structure of information stored in the requesting user information DB 312 will now be described with reference to FIG. 4. FIG. 4 is a diagram illustrating an example of the table configuration of information stored in the requesting user information DB 312. A table of information stored in the requesting user information DB 312 includes the fields of user ID, delivery location, vehicle ID, and package ID. In the user ID field, identification information for identifying requesting users is input. In the delivery location field, information on the locations to which requesting users demand to deliver packages is input. Note that information indicating the current location of the requesting user terminal 20B acquired when the server 30 receives a delivery request from the corresponding requesting user terminal 20B may be input in the delivery location field. A delivery location is, for example, represented by a latitude and a longitude or an address. In the vehicle ID field, information on the vehicle ID included in each delivery request is input. In the package ID field, information on the package ID included in each delivery request is input.

The vehicle information DB 313 is made up with information on the travel of the vehicle 10 (vehicle information) stored in the auxiliary memory unit 33 and is where association between each driver user and vehicle information is performed. Here, the structure of vehicle information stored in the vehicle information DB 313 will now be described with reference to FIG. 5. FIG. 5 is a diagram illustrating an example of the table configuration of vehicle information stored in the vehicle information DB 313. A vehicle information table includes the fields of user ID, departure point, delivery area, and delivery period. In the user ID field, identification information for identifying driver users is input. In the departure point field, information indicating the departure point of each vehicle 10 or the shipping point of each package is input. The departure point of each vehicle 10 or the shipping point of each package is, for example, represented by a latitude and a longitude or an address. The departure point of each vehicle 10 is the location of a store selling products, for example. In the delivery area field, information on the delivery area of each vehicle 10 is input. In the delivery period field, information on the period during which each vehicle 10 delivers packages is input.

The positional information DB 314 is made up with information indicating the current location of each potential user stored in the aforementioned auxiliary memory unit 33 and is where association between each potential user and positional information is performed. Here, the structure of positional information on each potential user stored in the positional information DB 314 will now be described with reference to FIG. 6. FIG. 6 is a diagram illustrating an example of the table configuration of positional information stored in the positional information DB 314. The potential user's positional information table includes the fields of user ID and current location. In the user ID field, identification information for identifying potential users is input. In the current location field, information indicating the current locations of potential users is input. Note that the current location of each potential user may be a pre-registered location where he/she demands to deliver packages. The current location of each potential user is represented, for example, by a latitude and a longitude. For example, positional information on each potential user may be transmitted from the potential user terminal 20C to the positional information acquisition unit 304 at regular intervals, and the positional information acquisition unit 304 receiving this positional information updates the current location field in the positional information DB 314 in accordance with this positional information.

Figure 7:
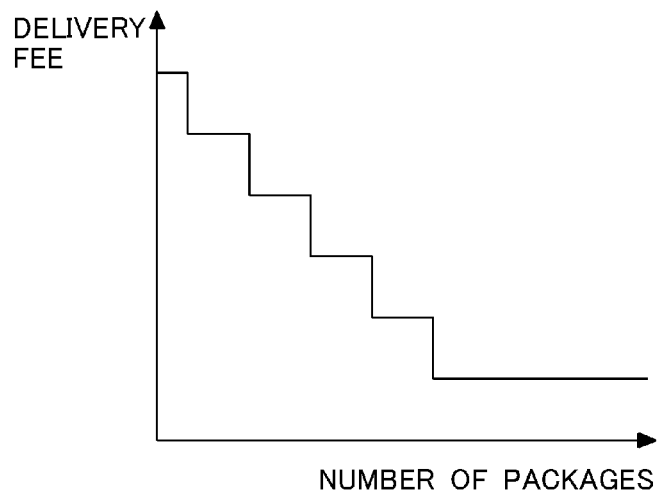
FIG. 7 is a diagram illustrating a relationship between the number of packages and delivery fee.

The fee information DB 315 is made up with fee information stored in the aforementioned auxiliary memory unit 33. FIG. 7 is a diagram illustrating a relationship between the number of packages and delivery fee. For example, the larger the current number of packages, the lower the delivery fee. The information illustrated in FIG. 7 is stored in the fee information DB 315 as fee information.

The map information DB 316 stores, as map information, for example, link data on roads (links), node data on node points, intersection data on intersections, search data for searching for routes, facility data on facilities, search data for searching for locations, and the like.

Figure 8:
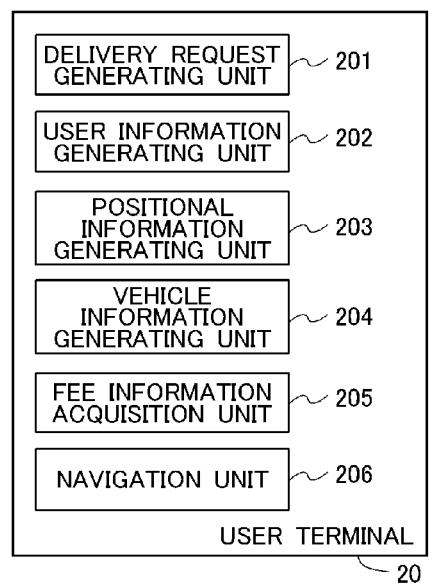
FIG. 8 is a diagram illustrating an example of the functional configuration of a user terminal.

The function of each user terminal 20 will now be explained. FIG. 8 is a diagram illustrating an example of the functional configuration of the user terminal 20. The user terminal 20 includes, as functional components, a delivery request generating unit 201, a user information generating unit 202, a positional information generating unit 203, a vehicle information generating unit 204, a fee information acquisition unit 205, and a navigation unit 206. The processor 21 in the user terminal 20 executes processing in the delivery request generating unit 201, the user information generating unit 202, the positional information generating unit 203, the vehicle information generating unit 204, the fee information acquisition unit 205, and the navigation unit 206, using computer programs in the main memory unit 22. Note that any one of the functional components or part of their processing may be executed with a hardware circuit.

The delivery request generating unit 201 outputs an operating screen on the output unit 25 and generates a delivery request according to an input by a potential user to the input unit 24 of the potential user terminal 20C. The delivery request generating unit 201 is a functional element that operates in the potential user terminal 20C. FIG. 9 is a diagram illustrating an example of a screen displayed on the output unit 25 of a potential user terminal 20C when the potential user terminal 20C receives fee information from the server 30. The output unit 25 displays the vehicle ID, departure point, and delivery fee related to each vehicle 10 that can deliver packages to the current location of the potential user. This screen is generated based on the fee information that a fee information acquisition unit 205, which will be described later, has received from the server 30. Note that store names, for example, may be displayed in the field of departure point illustrated in FIG. 9. When a potential user purchases a product at a store related to the departure point through mail order or the like after this screen is displayed, a package related to the product is shipped from the store and this package is delivered by a vehicle 10. The vehicle 10 that delivers this package is the vehicle 10 corresponding to the vehicle ID displayed on the screen illustrated in FIG. 9 and is the vehicle 10 the departure point of which is related to the store at which the product was purchased. The delivery fee is that displayed on the screen illustrated in FIG. 9 and is related to the vehicle ID of the vehicle 10 that delivers the package. For example, generation of a delivery request by the delivery request generating unit 201 may be triggered by the purchase of the product by the potential user. For example, when the potential user clicks the vehicle ID or departure point on the screen illustrated in FIG. 9, a screen on which the product related to that departure point can be purchased may be displayed on the output unit 25. When the potential user purchases the product on that screen, a delivery request may be generated. In addition, for example, after the potential user purchases the product related to the departure point illustrated in FIG. 9, a delivery request may be generated when the potential user clicks the vehicle ID or departure point on the screen illustrated in FIG. 9. The delivery request generating unit 201 transmits the generated delivery request to the server 30.

The user information generating unit 202 generates user information. The user information generating unit 202 is a functional element that operates in each of the driver user terminal 20A, the requesting user terminal 20B, and the potential user terminal 20C. The user information generating unit 202 displays an operating screen for promoting the input of user information on the output unit 25 and generates user information according to a user's input to the input unit 24. The generated user information is transmitted by the user information generating unit 202 to the server 30. For example, when each user performs user registration, the user information generating unit 202 generates user information and transmits it to the server 30.

Moreover, the positional information generating unit 203 generates positional information on the potential user. The positional information generating unit 203 is a functional element that operates in the potential user terminal 20C. The positional information generating unit 203 generates positional information based on information acquired by the positional information sensor 27. The generated positional information is transmitted by the positional information generating unit 203 to the server 30. Note that positional information may be input by the potential user through the input unit 24 and stored in the auxiliary memory unit 23 in advance. The positional information generating unit 203 may generate positional information based on data stored in the auxiliary memory unit 23. Further, the positional information generating unit 203 may transmit positional information along with a user ID from the potential user terminal 20C to the server 30 at predetermined intervals (for example, 60 seconds).

The vehicle information generating unit 204 generates information on the travel of the vehicle 10 (vehicle information). In other words, information including information on the departure point, delivery area, and delivery period of the vehicle 10 is generated. The vehicle information generating unit 204 is a functional element that operates in the driver user terminal 20A. The vehicle information generating unit 204 displays an operating screen for promoting the input of vehicle information on the output unit 25 and generates vehicle information according to a driver user's input to the input unit 24. Note that the vehicle information generating unit 204 may detect the current location of the driver user terminal 20A on the basis of the positional information acquired by the positional information sensor 27 and this current location may be regarded as the departure point of the vehicle 10. The generated vehicle information is transmitted by the vehicle information generating unit 204 to the server 30. Note that vehicle information may be input by the driver user through the input unit 24 in advance and stored in the auxiliary memory unit 23 of the driver user terminal 20A. The vehicle information generating unit 204 may generate vehicle information based on data stored in the auxiliary memory unit 23.

The fee information acquisition unit 205 acquires fee information transmitted from the server 30. The fee information acquisition unit 205 is a functional element that operates in the potential user terminal 20C. The fee information acquired by the fee information acquisition unit 205 is stored in the auxiliary memory unit 23 and also transmitted to the delivery request generating unit 201. Note that, even after acquisition of the fee information, the potential user terminal 20C can force the output unit 25 to output an image according to the fee information stored in the auxiliary memory unit 23 in response to potential user's operation on the input unit 24. The fee information acquisition unit 205 may have a function of requesting the server 30 to transmit fee information.

The navigation unit 206 displays, on the output unit 25, the map of an area at or around the current location of the user terminal 20 (or the departure point of the vehicle 10) according to map information and the like stored in the auxiliary memory unit 23. In addition, upon reception of a travel path from the server 30, the navigation unit 206 provides route guidance along the received travel path. At the time, the navigation unit 206 outputs the travel path to the output unit 25. The navigation unit 206 displays, for example, the map and the travel path on the display or guides to travel directions along the travel path with sounds. The function of the navigation unit 206 can be implemented by using a well-known technique. Although travel paths of vehicles 10 are generated in the route generating unit 306 of the server 30 in the delivery system 1, this generation of travel paths may be performed in the navigation unit 206 of a driver user terminal 20A.

Figure 10:
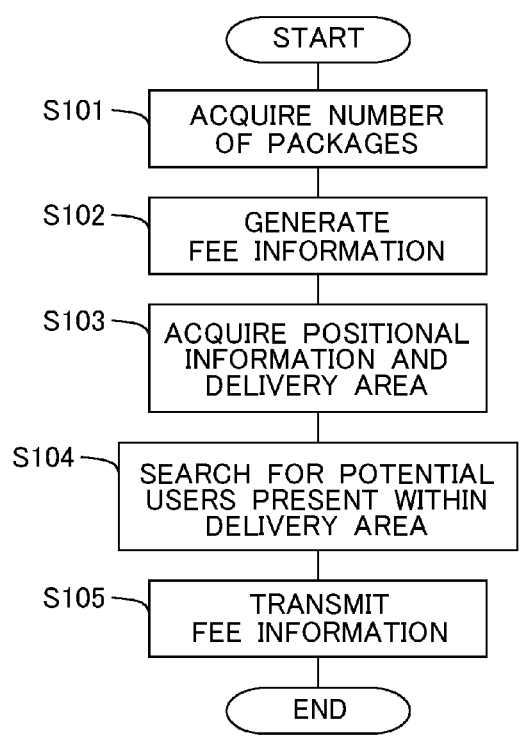
FIG. 10 is an example flow chart of fee information providing processing according to the first embodiment.

Fee information providing processing will now be explained. FIG. 10 is an example flow chart of fee information providing processing according to this embodiment. The fee information providing processing illustrated in FIG. 10 is executed by the fee information providing unit 305 for each vehicle 10 at predetermined intervals. Each time the number of packages increases, fee information providing processing may be executed for the vehicle 10 for which the number of packages has been increased. Here, it is assumed that the server 30 receives the driver user's user information and the vehicle 10's vehicle information from the driver user terminal 20A, and the potential user's user information and positional information from the potential user terminal 20C.

In Step S101, the number of packages (first packages) scheduled to be delivered by the vehicle 10 is acquired. The number of first packages is acquired from the requesting user information DB 312. Here, in the requesting user information DB 312, the number of package IDs related to the vehicle 10 is counted. Next, in Step S102, fee information is generated. The fee information providing unit 305 calculates the current delivery fee according to the number of first packages, and generates fee information according to the calculated delivery fee. In Step S103, the positional information stored in the positional information DB 314 and information on the delivery area of the vehicle 10 stored in the vehicle information DB 313 are acquired.

Subsequently, Step S104 searches for potential users whose current locations are present within the delivery area, on the basis of the positional information and the information on the delivery area acquired in Step S103. The fee information providing unit 305 picks up all potential users whose current locations are present within the delivery area, according to the positional information on each potential user. Subsequently, in Step S105, the fee information generated in Step S102 is transmitted to the potential user terminals 20C corresponding to the potential users picked up in Step S104. Afterwards, the processing illustrated in FIG. 10 ends.

Figure 11:
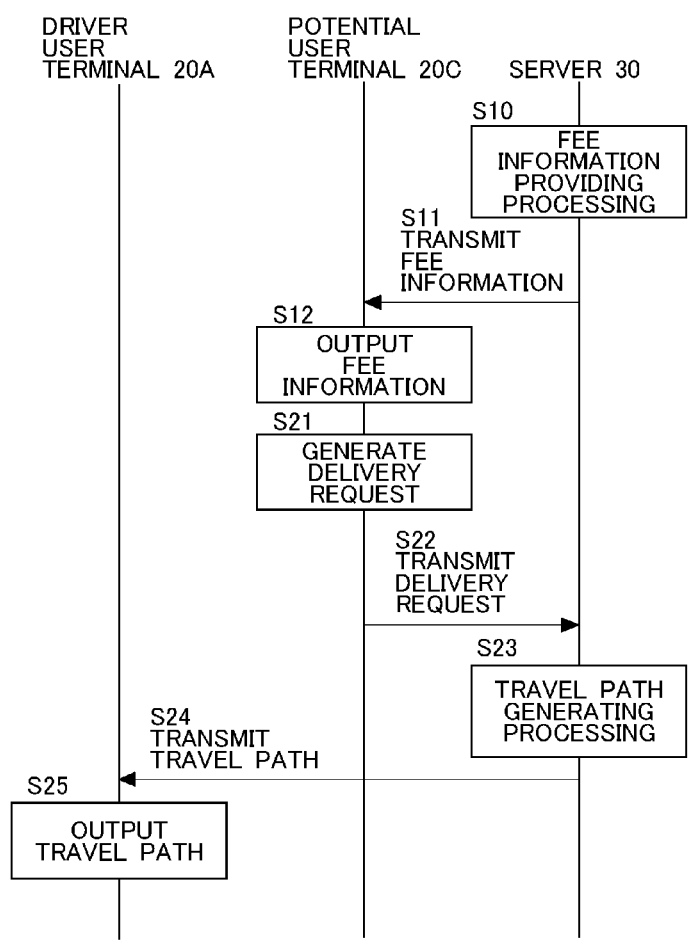
FIG. 11 is a diagram illustrating a sequence of processing in the delivery system according to the first embodiment.

The operation of the delivery system 1 will now be explained. FIG. 11 is a diagram illustrating a sequence of processing in the delivery system 1. In the sequence diagram illustrated in FIG. 11, it is assumed that there are one driver user and one potential user, and the potential user demands delivery by a vehicle 10. It is also assumed that vehicle information and user information are acquired by the server 30 in advance. Suppose also that positional information on a potential user is transmitted from the potential user terminal 20C to the server 30 at predetermined intervals.

In S10, the server 30 executes the fee information providing processing illustrated in FIG. 10. In the fee information providing processing, the fee information is transmitted to the potential user terminal 20C (processing in S11). Upon reception of the fee information, the potential user terminal 20C forces the output unit 25 to output an image related to the fee information as illustrated in FIG. 9 (processing in S12).

Since the delivery fee is output to the potential user terminal 20C, the potential user can know the current delivery fee that occurs when a product is purchased. In addition, when the potential user purchases the product, the potential user clicks the vehicle ID displayed on the screen of the potential user terminal 20C, for example. In response to this, the potential user terminal 20C generates a delivery request (processing in S21). This delivery request is transmitted from the potential user terminal 20C to the server 30 in S22. At the time when the server 30 receives the delivery request, the potential user changes to a requesting user, and the potential user terminal 20C changes a requesting user terminal 20B. Upon reception of the delivery request, the server 30 generates a travel path of the vehicle 10 on the basis of the positional information on the requesting user and the vehicle information on the vehicle 10 (processing in S23). The travel path is generated so that the vehicle 10 goes through the departure point and the delivery location, for example, in the shortest distance. Information on the generated scheduled travel path is transmitted from the server 30 to the driver user terminal 20A (processing in S24). Upon reception of the information on the travel path, the driver user terminal 20A outputs the travel path to the output unit 25 and guides the driver user along the travel path (processing in S25).

Figure 12:
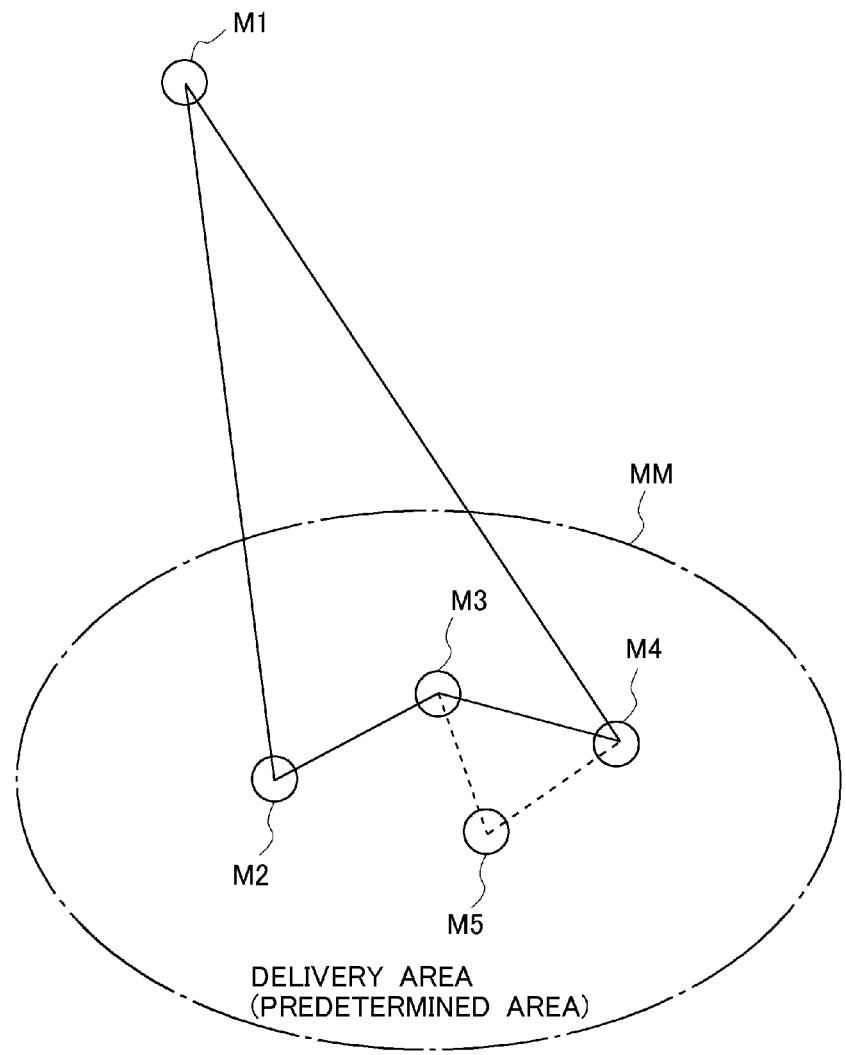
FIG. 12 is a diagram schematically illustrating the travel path of a vehicle.

FIG. 12 is a diagram schematically illustrating the travel path of the vehicle 10. In FIG. 12, M1 represents a departure point (a predetermined place), M2, M3, and M4 represent the locations of requesting users (delivery locations), and M5 represents the location of a potential user (a location that can be a delivery location). The solid line represents the travel path of the vehicle 10, and the dashed line represents the travel path of the vehicle 10 resulting after the potential user present at the location represented by M5 makes a package delivery request. Further, MM (dashed-dotted line) represents a delivery area. The vehicle 10 departs from the departure point M1, delivers the package, and then returns to the departure point M1. In FIG. 12, in the case where the requesting users are present at M2, M3, and M4, respectively, the route generating unit 306 generates a travel path so that the vehicle 10 passes through M1, M2, M3, M4, and M1 in this order. Meanwhile, the server 30 transmits fee information to the potential user terminal 20C of the potential user present at the location represented by M5. Upon reception of a delivery request from the potential user terminal 20C thereafter, the route generating unit 306 generates a travel path that additionally passes through M5. In other words, the travel path is generated so that the vehicle 10 passes through M1, M2, M3, M5, M4, and M1 in this order.

As described above, with the delivery system 1 according to this embodiment, the delivery fee decreases according to the number of packages to be delivered by the vehicle 10, so that users can easily request delivery. This can encourage users to purchase products. Hence, the sales at the store can be increased. In addition, cost reduction is achieved because more packages can be delivered together.

Second Embodiment

In this embodiment, a future delivery fee is estimated on the basis of the number of packages that were actually delivered by a vehicle 10 in the past, and the estimated delivery fee is provided to potential users. For example, in some cases, the number of first packages may differ depending on the date, day, time, weather, or the like. Aside from that, for example, in the event of sale, event, or the like at a commercial facility, the number of first packages is estimated to increase from usual. If the past number of first packages related to each condition is stored in the server 30, the number of first packages related to each condition can be estimated. Calculation of the delivery fee according to the estimated number of first packages allows the future delivery fee to be estimated. The description below is based on the assumption that the delivery fee according to the time range is estimated.

Figure 13:
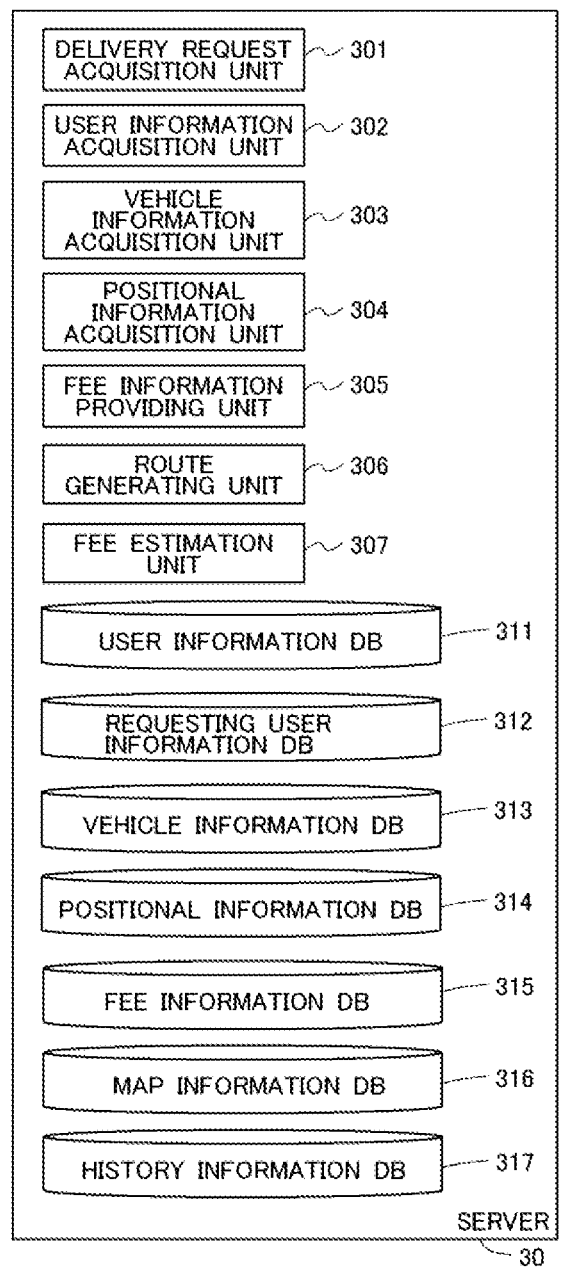
FIG. 13 is a diagram illustrating an example of the functional configuration of a server according to a second embodiment.

FIG. 13 is a diagram illustrating an example of the functional configuration of the server 30. Features different from in the functional configuration of the server 30 illustrated in FIG. 3 will be mainly described. The server 30 further includes a fee estimation unit 307 and a history information DB 317 as functional elements. The processor 31 of the server 30 executes the processing in the fee estimation unit 307 through computer programs in the main memory unit 32. Note that any one of the functional components or part of their processing may be executed with a hardware circuit. The history information DB 317 is constructed when programs in a database management system (DBMS) executed by the processor 31 manage data stored in the auxiliary memory unit 33. The history information DB 317 is a relational database, for example.

The history information DB 317 is made up with information on the number of packages in the past (hereinafter also referred to as history information) stored in the auxiliary memory unit 33 and is where association between the vehicle 10 and history information is performed. The structure of history information stored in the history information DB 317 will now be described with reference to FIG. 14. FIG. 14 is a diagram illustrating an example of the table configuration of history information stored in a history information DB. A history information table includes the fields of vehicle ID, time range, number of packages, departure point, and delivery area. In the vehicle ID field, identification information for identifying vehicles 10 is input. In the time range field, information for identifying time ranges in which each vehicle 10 delivered the packages in the past is input. The time ranges are hourly divided. In the number of packages field, information indicating the number of packages that were delivered by the vehicle 10 in the past is input. In the departure point field, information indicating the departure point of the vehicle 10 for past package delivery is input. In the delivery area field, information on the delivery area related to past package delivery by the vehicle 10. As described above, in the history information DB 317, information on the time range, the number of packages, the departure point, and the delivery area related to package delivery is input in association with the vehicle 10 that delivered the packages.

The fee estimation unit 307 calculates the delivery fee that occurs when it is assumed that a potential user requests package delivery in the future, according to the past number of packages. When there are multiple vehicles 10 that deliver packages in the same time range from the same departure point to the same delivery area, the average of these numbers of packages may be employed. The fee estimation unit 307 calculates the delivery fee related to the past number of packages. To refer to a relationship between the number of packages and the delivery fee, information stored in the fee information DB 315 is used. The fee estimation unit 307 then searches for potential users whose current locations are within the area of the past delivery by the vehicle 10. Subsequently, the potential user terminal 20C of a potential user found by the searching is provided with information on the estimated delivery fee (estimated fee information). The estimated fee information provided to the potential user includes information on the departure point and time range related to the vehicle 10. The estimated fee information is received by the fee information acquisition unit 205 of the potential user terminal 20C.

Receiving the estimated fee information, the fee information acquisition unit 205 of the potential user terminal 20C outputs the time range, departure point, and estimated delivery fee (estimated fee) based on the estimated fee information to the output unit 25. FIG. 15 is a diagram illustrating an example of a screen displayed on the output unit 25 of the potential user terminal 20C that has received estimated fee information. The output unit 25 displays time ranges, destinations, and estimated fees.

Estimated fee information is transmitted, for example, to the potential user terminal 20C before the corresponding time range (for example, the day before the corresponding time range). In addition, for example, estimated fee information corresponding to each time range during a week may be transmitted to the potential user terminal 20C during the week before that week. Since estimated fee information is transmitted to the potential user terminal 20C as described above, potential users can receive information for deciding a time range for purchasing a product, enhancing the convenience of potential users. Moreover, potential users can know in advance how much the delivery fee will decrease in the future, encouraging the potential users to purchase products in the future.

Figure 16:
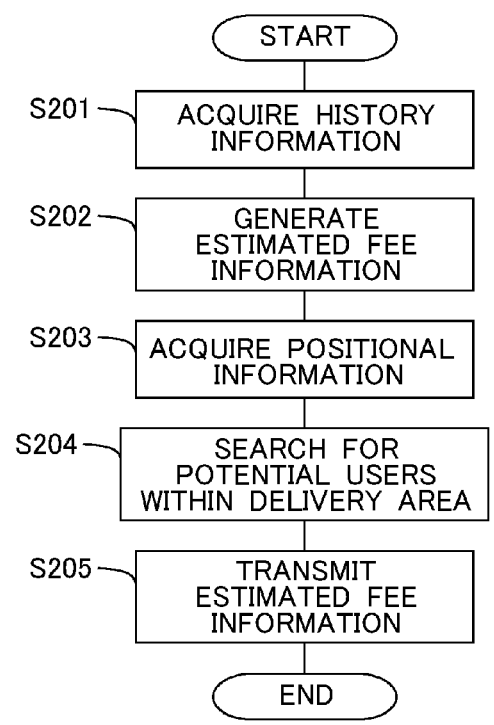
FIG. 16 is an example flow chart of processing for providing estimated fee information to a potential user, according to the second embodiment.

FIG. 16 is an example flow chart of processing for providing estimated fee information to a potential user, according to this embodiment. The processing illustrated in FIG. 16 is executed for each vehicle 10 by the fee estimation unit 307 at predetermined intervals. Here, it is assumed that the server 30 receives the potential user's user information and positional information from the potential user terminal 20C, and the history information DB 317 stores history information.

In Step S201, history information stored in the history information DB 317 is acquired. Next, in Step S202, estimated fee information is generated. The fee estimation unit 307 refers to the history information DB 317 to calculate the estimated fee for the vehicle 10. Subsequently, estimated fee information is generated on the basis of the calculated estimated fee.

In Step S203, positional information stored in the positional information DB 314 is acquired. Subsequently, Step S204 searches for potential users whose current locations are present within the delivery area in the past on the basis of the positional information acquired in Step S203 and the travel path acquired in Step S201. Subsequently, in Step S205, the estimated fee information generated in Step S202 is transmitted to the potential user terminals 20C corresponding to the potential users searched in Step S204. Afterwards, the processing illustrated in FIG. 16 ends.

As explained above, with the delivery system 1 according to this embodiment, potential users can know a fee estimated assuming that they demand package delivery in the future. Hence, potential users who knew periods during which the delivery fee decreases can easily purchase products in these periods. This can promote the purchase of products in these periods, so that more packages can be delivered together.

Other Embodiments

The above-described embodiment is merely illustrative and appropriate modification can be made without departing from the scope of the present disclosure.

The processing and means described in this disclosure can be freely combined unless inconsistencies arise.

In addition, processing supposed to be done with one apparatus according to the above description may be executed with multiple apparatuses. Alternatively, processing supposed to be done with different apparatuses according to the above description may be executed with one apparatus. In the computer system, the type of hardware configuration (server configuration) used to implement each function can be flexibly changed.

The present disclosure can be implemented when a computer program having the functions that have been described in the above embodiment is supplied to a computer, and one or more processors in the computer read and execute the program. Such a computer program may be provided to the computer via a non-transitory computer-readable memory medium that can be connected to the computer's system bus or via a network. Examples of non-transitory computer-readable memory medium include any type of disks such as magnetic disks (such as floppy (registered trademark) disks and hard disk drives (HDDs)), and optical disks (such as CD-ROMs, DVD disks, and Blu-ray disks), read only memories (ROMs), random access memories (RAMs), EPROMs, EEPROMs, magnetic cards, flash memories, optical cards, and any type of media suitable for storing electronic instructions.

What is claimed is:

1. An information processing apparatus comprising a controller, wherein
the controller acquires a number of first packages scheduled to be delivered by a vehicle that delivers packages to a predetermined area, at least one of the first packages to be delivered to a first user who already requested the at least one of the first packages,
after the at least one of the first packages is delivered, the controller sets an estimated cost of delivering second packages by the vehicle on the basis of the number of first packages actually delivered by the vehicle in the past, the second packages being different from the first packages, the estimated cost being a cost of delivering the second packages by the vehicle in the future,
the controller provides information on the estimated cost to a user terminal of a second user who is present within the predetermined area and yet to request delivery of the second packages,
the controller generates a path of travel for the vehicle so that the path passes by a location of the first user, and when the second user requests delivery of the second packages, the controller modifies the path of travel of the vehicle so that the path also passes by a location of the second user, the controller provides the generated path to the vehicle, and the vehicle is an autonomous vehicle and the controller instructs the vehicle to autonomously travel along the path of travel.

2. The information processing apparatus according to claim 1, wherein the controller sets the cost so that the larger the number of first packages, the lower the cost.

3. An information processing method comprising:

acquiring a number of first packages scheduled to be delivered by a vehicle that delivers packages to a predetermined area, at least one of the first packages to be delivered to a first user who already requested the at least one of the first packages;

after the at least one of the first packages is delivered, setting an estimated cost of delivering second packages by the vehicle on the basis of the number of first packages actually delivered by the vehicle in the past, the second packages being different from the first packages, the estimated cost being a cost of delivering the second packages by the vehicle in the future;

providing information on the cost to a user terminal of a second user who is present within the predetermined area and yet to request delivery of the second packages;

generating a path of travel for the vehicle so that the path passes by a location of the first user, and when the second user requests delivery of the second packages, modifying the path of travel of the vehicle so that the path also passes by a location of the second user; and providing the generated path to the vehicle, wherein the vehicle is an autonomous vehicle and the vehicle is instructed to autonomously travel along the path of travel.

4. A non-transitory computer-readable storage medium that stores an information processing program, the information processing program causing a computer to execute steps comprising:

acquiring a number of first packages scheduled to be delivered by a vehicle that delivers packages to a predetermined area, at least one of the first packages to be delivered to a first user who already requested the at least one of the first packages;

after the at least one of the first packages is delivered, setting an estimated cost of delivering second packages by the vehicle on the basis of the number of first packages actually delivered by the vehicle in the past, the second packages being different from the first packages, the estimated cost being a cost of delivering the second packages by the vehicle in the future;

providing information on the cost to a user terminal of a second user who is present within the predetermined area and yet to request delivery of the second packages;

generating a path of travel for the vehicle so that the path passes by a location of the first user, and when the second user requests delivery of the second packages, modifying the path of travel of the vehicle so that the path also passes by a location of the second user; and providing the generated path to the vehicle, wherein the vehicle is an autonomous vehicle and the vehicle is instructed to autonomously travel along the path of travel.

5. The information processing apparatus according to claim 1, wherein the controller is further configured to search for a plurality of second users who are yet to request delivery of the second packages, including the second user, within the predetermined area, based on current location information for the plurality of second users.

6. The information processing apparatus according to claim 1, wherein the controller calculates a plurality of estimated costs for delivery of the second packages, the plurality of estimated costs including the estimated cost, each one of the plurality of estimated costs corresponding to a different delivery timeframe.

* * * * *